United States Patent Office 3,583,911
Patented June 8, 1971

3,583,911
ACRYLIC ACID-METHYL CELLULOSE GRAFT COPOLYMERS FOR TREATING SUB-BENTONITIC CLAY
William J. Lang, Libertyville, Ill., assignor to International Minerals & Chemical Corporation
No Drawing. Filed Sept. 4, 1968, Ser. No. 757,472
Int. Cl. C08f 3/00
U.S. Cl. 252—8.5                                                 17 Claims

ABSTRACT OF THE DISCLOSURE

Water-soluble graft copolymers of acrylic acid with methyl cellulose containing up to 10% by weight, based on the weight of acrylic acid, of methyl cellulose, and water-soluble salts thereof, are useful for treating sub-bentonitic clays, such as to render them especially useful in well drilling.

BACKGROUND OF THE INVENTION

This invention relates to the use of graft copolymers for beneficiating clay and to drilling muds containing graft copolymers. More specifically, this invention relates to the use of water-soluble graft copolymers of acrylic acid with methyl cellulose and water-soluble salts, e.g., ammonium and alkali metal salts, of such graft copolymers for treating clays, such as to render them especially useful in well drilling.

The so-called "grafted" polymerizates are well known in the art. Various procedures have been devised for the production of these grafted polymers. These procedures entail either inducing side chain-forming monomers to polymerize in the presence of another, already preformed, polymer which serves as a principal chain and to which the polymerizing monomers attach themselves, or joining said chain macromolecules with another macromolecule which is separately produced and serves as a principal chain. The graft copolymers thus produced are different from other polymers by virtue of their special properties.

It is well known in the art to utilize graft polymerization techniques to modify properties of various materials, as for example, cellulose and cellulosic materials. For example, U.S. Pat. No. 2,922,768 of Mino and Kaizerman describes a process of preparing graft copolymers by polymerizing a polymerizable vinylindine monomer, such as acrylic or methacrylic acid, in an aqueous medium at a pH not greater than 3.5 and a polymeric organic reducing agent, such as cellulose or methyl cellulose, in the presence of a ceric salt. Faessinger and Conte disclose in U.S. Pat. No. 3,359,224 a process of producing graft copolymers which comprises reacting a water-insoluble cellulose or amylaceous monothiocarbonate or dithiocarbonate substrate by peroxide free radical initiation with acrylic acid or another ethylenically unsaturated monomer.

The prior art discloses a variety of polymers such as polyacrylate-type polymers as being useful for beneficiating clays by chemical treatment to render them especially useful for use in well drilling muds of widely varying compositions. Such drilling fluids are circulated in a well being drilled by the rotary process to provide lubrication during the drilling operation, to carry the cuttings to the surface, and for a number of other purposes.

Clays suitable for drilling fluids or muds are of two general types: Western or natural sodium bentonitic clays and native or sub-bentonitic clays. The yield value of a particular clay is the determining factor insofar as its use in the preparation of a drilling mud is concerned. The Western and sub-bentonitic clays exhibit different yield characteristics, apparently due to differences in their chemical compositions. Sub-bentonitic clays are generally calcium or magnesium varieties of montmorillonite and may contain substantial proportions of non-clay or non-montmorillonite impurities. The Western bentonitic clays are natural sodium clays.

The yield of clay is defined as the number of barrels of an aqueous dispersion or mud having a viscosity of 15 centipoises which can be prepared from a ton of clay. Generally speaking, a yield of at least 90 barrels of 15 centipoises mud per ton of clay is the minimum standard for acceptable clays. A yield of this magnitude can be expected with the purer forms of natural sodium bentonite such as Wyoming bentonite but is not attained with the calcium and other meta- and sub-bentonites, which produce only from about 25 to 60 barrels. There is a need, therefore, for increasing the yields obtainable from the sub-bentonitic clays so as to increase their utility in mud-making.

Attempts have been made to up-grade the sub-bentonitic clays, but such attempts have been generally unsuccessful. One method widely used has been to add to the clay a peptizing agent such as soda ash or sodium carbonate. This method of base exchanging the calcium ions with sodium ions has not always been successful by any means probably because the base exchange cannot be forced to completion in a practical manner and the slight improvement achieved is not economical. A number of polymers have also been suggested for use in up-grading clays.

As illustrative of the types of polymers disclosed as being useful for treating clays for drilling muds, U.S. Pat. No. 3,216,934 of Reinhard relates to the use of a water-soluble interpolymer of maleic anhydride, an olefin having from 2 to 4 carbon atoms, and hexadiene-1,5. The patentee teaches that sodium carbonate or soda ash should be used with the polymer to treat sub-bentonitic clays. Dawson, U.S. Pat. No. 2,702,788, relates to the use of the sodium salt of polyacrylic acid and soda ash for treating sub-bentonitic clays.

A polymer which is commercially sold for increasing the yield of bentonite to provide a very low solids drilling fluid is sodium polyacrylate sold under the name of Benex of Pan American Petroleum Corporation. Another polymer marketed under the name of M-7 is sold by Jorco Chemical Company, Inc. for treating natural sodium bentonite clays.

SUMMARY OF THE INVENTION

This invention is based on the discovery that novel graft copolymers prepared by graft copolymerizing acrylic acid onto a minor amount of methyl cellulose and water-soluble salts thereof are useful for beneficiating sub-bentonitic clays for use in well drilling fluids.

The graft copolymers are prepared by reacting acrylic acid with from about 0.1 to about 10% by weight, based on the weight of acrylic acid, of methyl cellulose, in an aqueous medium at a pH not greater than 3.5 by initiating the reaction with ultraviolet light or a peroxygen-type polymerization catalyst. The graft copolymer thus produced may be converted to the salt form by the addition of a suitable alkali metal hydroxide such as sodium hydroxide to a polymer-containing aqueous medium in an amount sufficient to neutralize the polymer. If desired, the aqueous medium containing the polymer, in either the acid form or the salt form, is heated in accordance with conventional techniques to yield a dry water-soluble polymer.

The graft copolymers thus produced are useful, in either the acid or salt form, in combination with sub-bentonitic clays to increase the yields of the clays so as to render them especially useful in drilling muds. The yield of a sub-bentonitic clay is increased in accordance with this invention by combining with the clay a minor amount, e.g., from about 0.1 to about 12 pounds per ton of clay, of the graft copolymer in any desired manner. The drilling muds containing the graft copolymers in combination with the clay are also less sensitive to high temperatures and salt contamination than drilling muds of substantially the same compositions without the graft copolymers. Still another advantage in the use of the graft copolymers is that they have a lower sensitivity with respect to amounts utilized than polymers of the prior art.

Therefore, in one aspect of this invention the yield of a sub-bentonitic clay is increased by intimately admixing with said clay at least one graft copolymer of acrylic acid and methyl cellulose, or a water-soluble salt of said graft copolymer, in an amount sufficient to increase the yield of said clay, e.g., to render said clay comparable to natural sodium bentonites.

Another aspect of this invention is a composition of matter consisting essentially of an intimate admixture of a sub-bentonitic clay and a minor amount of at least one graft copolymer of acrylic acid and methyl cellulose, or a water-soluble salt of said graft copolymer.

Still another aspect of this invention is a drilling fluid consisting essentially of water, a sub-bentonitic clay and at least one graft copolymer of acrylic acid and methyl cellulose, or a water-soluble salt of said graft copolymer, in an amount sufficient to increase the yield of said clay. The drilling fluid may also contain minor amounts of other materials which are normally added to drilling fluids, such as weighting agents.

A further aspect of this invention is a method of drilling a well comprising operating a power-driven cutting bit in the bottom of the well to drill the well deeper and thus produce bit cuttings and circulating a drilling fluid in the well to remove the bit cuttings from the well, wherein the drilling fluid consists essentially of water, a sub-bentonitic clay and at least one graft copolymer of acrylic acid and methyl cellulose, or a water-soluble salt of said graft copolymer, in an amount sufficient to increase the yield of said clay. The drilling fluid may also contain minor amounts of other materials which are normally added to drilling fluids, such as weighting agents.

DESCRIPTION OF THE PREFERRED EMBODIMENTS

In the preparation of the useful graft copolymers, the amount of the methyl cellulose reacted with the acrylic acid may vary between about 0.1 and 10.0%, preferably between about 0.25 and about 5.0%, based on the total weight of the acrylic acid used.

The graft copolymerization can be carried out by using well-known polymerization techniques. Uutraviolet light or any of the well-known peroxygen-type initiators, e.g., peroxide free radical initiators, may be used. The preferred peroxygen-type initiators are hydrogen peroxide and hydroperoxides such as t-butyl hydroperoxide, diisopropylbenzene hydroperoxide, cumene hydroperoxide, 1-phenylethyl hydroperoxide, and the like. Other useful peroxide initiators are diacyl peroxides such as benzoyl peroxide and acetyl peroxide, and dialkyl peroxides such as di-t-butyl peroxide and dicumyl peroxide. Still other useful peroxygen-type initiators include per-salts such as sodium, potassium or ammonium persulfate and sodium perborate; the peresters such as t-butyl peroxyacetate and t-butyl peroxybenzoate; and the peracids such as performic acid, peracetic acid, perbenzoic acid, and peroxylactic acid. If desired, Redox activated systems can be used in accordance with the usual polymerization practices. Thus, sodium bisulfite-potassium persulfate and hydrogen peroxide-ferrous ion systems may be employed. However, the incremental addition of the peroxygen-type initiator is preferred when a Redox activated system is utilized.

The quantity of the initiator employed can be varied depending on the reaction temperature and other conditions, but will ordinarily be from about 0.0005 to about 0.01% by weight, preferably from about 0.002 to about 0.004% by weight, based on the weight of the acrylic acid.

The temperature of the reaction is not critical and may vary between about $-5°$ C. and about 100° C. The preferred temperature range is between about 40° C. and about 80° C., with a temperature between about 60° C. and about 70° C. being most preferred. The reaction may be carried out under superatmospheric pressure or even under partial vacuum. However, it is preferred to utilize atmospheric pressure for convenience since the reaction runs very favorably at this pressure.

The graft copolymerization reaction is carried out in an acidic aqueous medium. The pH of the reaction medium may be any value up to and including about 3.5. It is preferred to maintain the pH between about 3.0 and about 3.5 for optimum results. In the event the amount of acrylic acid utilized is not sufficient to lower the pH of the reaction medium to a value of 3.5 or lower, the desired pH may be obtained by the addition of a suitable mineral acid such as sulfuric acid, nitric acid or hydrochloric acid.

The reactants and the initiator are combined in the aqueous reaction medium in any conventional manner. However, the initiator should not be added to the reaction medium containing only the acrylic acid since this could cause the polymerization of the acrylic acid in the absence of the methyl cellulose substrate. As illustrative of a suitable manner of combining the reactants, the acrylic acid and the methyl cellulose are each dissolved in separate amounts of water so as to provide homogeneous solutions thereof. These solutions are mixed and the initiator is then added to the mixed solution. Alternatively, the methyl cellulose may be dissolved in water to provide a homogeneous solution to which the acrylic acid and the initiator are added. Other methods of combining the reactants and initiator will be obvious to one skilled in the art. Optimum results will be obtained if the methyl cellulose is thoroughly dissolved in at least a part of the aqueous reaction medium before it is combined with the acrylic acid. Stirring or shaking of the reaction mixture will facilitate the polymerization and result in more uniform polymers.

The reaction time will vary according to the reaction temperatures and/or quantity of the initiator present. In general, the time should be sufficient to consume at least 95% of the acrylic acid. To illustrate the variance of the reaction time at different temperatures, polymerization will be evident in about 5 to 7 hours when acrylic acid is reacted at 60° C. with about 1.0% by weight of methyl cellulose, based on the weight of the acrylic acid, and 0.002% by weight of hydrogen peroxide, based on the weight of acrylic acid, is present. On the other hand, polymerization is complete in about 15 to 20 minutes when the reaction is carried out at 100° C. using the same relative amounts of the reactants and the initiator. Completion of the polymerization reaction may be detected by the absence of the distinctive odor of acrylic acid.

At the completion of the polymerization reaction, the copolymer thus produced may be converted to the salt form. This conversion is generally effected by neutralization with an appropriate hydroxide. Alkali metal or ammonium salts of the copolymers such as sodium, potassium and lithium salts may be obtained by reacting the copolymers with the corresponding hydroxide. Where complete neutralization is desired, a stoichiometric amount, and preferably a slight excess, of the hydroxide is used. Partial salts may, of course, be produced by using less than the quantity of alkali metal or ammonium hydroxide to effect complete conversion of the carboxyl groups.

The copolymers, in either the acid form or the salt form, may be converted to a dry form if so desired. This may be accomplished by conventional techniques, such as by heating the aqueous solution of the copolymer in a drum drier at a temperature of about 105° C. to drive off the water and yield a dry polymer, The graft copolymers thus produced are useful for treating sub-bentonitic clays to render them especially useful in drilling muds. When the graft copolymers are used for treating clays, the copolymer is combined with the clay in any desired manner. For example, a simple mechanical mixture of the clay and copolymer is prepared by dry-blending the copolymer in powder form directly with dry clay. This can be done conveniently at the time the clay is ground, as for example, in a roller mill. Alternatively, an aqueous solution of the copolymer may be sprayed directly onto the clay either in stock piles, after crushing, during a grinding operation, or during a bag-packing operation. Also, if desired, the clay and copolymer can be separately added in any desired order to form a slurry. This type of wet mixing could be employed, as for example, at the well site.

The sub-bentonitic clay is treated with an amount of the copolymer which is sufficient to increase the yield of the clay. The amount of the copolymer needed depends to some extent on the degree of beneficiation desired and varies with the clay, but generally only small quantities are required. Amounts within the range of from about 0.1 to about 12 pounds per ton of clay will produce satisfactory results. The preferred quantities for treatment are from about 0.5 to about 4 pounds of polymer per ton of clay.

The graft copolymers are employed for best results together with an alkali metal compound which is water-soluble, ionizable, and has an ion capable of reacting with calcium to form a water-insoluble precipitate. Such compounds include, as for example, alkali metal carbonates, hypophosphates, oxalates, phosphates, silicates, sulfites, and tartrates. Sodium carbonate or soda ash is particularly preferred. The amount of the alkali metal compound employed will be somewhat dependent upon the proportion of calcium montmorillonite in the whole clay. In general, amounts from about 0.5% to about 7% by weight of the clay can be used with increasing amounts giving higher degrees of beneficiation. However, it is preferred to employ amounts slightly less than 7% since quantities in excess of this amount can act to reduce the yield of the clay. With soda ash, for example, preferred amounts are from about 2% to about 4% by weight, with optimum results being obtained with about 3% by weight.

It will be evident to those skilled in the art that the drilling muds containing the polymer-treated clay may also contain materials in addition to the treated clay and water. For example, the drilling muds may also contain weighting agents such as barite, oil, treating chemicals such as caustic, surface active agents, and other materials commonly found in or added to drilling muds.

The following non-limiting example will further illustrate the present invention.

Tests were conducted to demonstrate the effectiveness of the graft copolymers and salts thereof for use in combination with sub-bentonitic clays to render them comparable to natural sodium bentonites for use in drilling muds or fluids. The optimum level of soda ash treatment was first determined by adding 22.5 gram samples of a dry sub-bentonitic clay obtained from the area of Milos, Greece to 350 milliliter quantities of distilled water while mixing the same in a Hamilton-Beach mixer. After the clay suspensions were thoroughly mixed, soda ash was added to the suspensions in 1% increments ranging from 2% to 7% by weight, based on the weight of the clay, and the suspensions were mixed for an additional 20 minutes. No soda ash was added to one of the suspensions for the purpose of having a blank sample for comparison. The suspensions were allowed to stand for 24 hours. After this aging, the suspensions were again subjected to agitation for 5 minutes in a Hamilton-Beach mixer and a Fann viscosimiter was used to determine the viscosities and yields.

It was determined that the optimum level of soda ash treatment was reached when the plastic viscosity does not show an increase with the addition of increasing increments of soda ash, or at the soda ash level below that where the plastic viscosity is accompanied by an increase in yield point two and one-half times the plastic viscosity, whichever is lower. The optimum level of soda ash treatment in these tests was found to be between 2 and 3%.

After the optimum level of soda ash treatment was determined, samples of the clay were treated with 2.3% by weight of soda ash by mixing the soda ash with the clay and grinding the mixture. The above procedure of preparing and aging the suspensions is then repeated, except that the soda-ash treated clay is used and a sodium salt of any acrylic acid-methyl cellulose graft copolymer prepared as hereinbefore described is added in lieu of the soda ash to separate quantities of the suspension in the Hamilton-Beach mixer at levels of 0.1 and 0.2% by weight, based on the weight of the clay. The following results are obtained when the viscosities are determined.

| Additive | Apparent viscosity, cps. | Plastic viscosity cps. |
|---|---|---|
| None | 2.5 | 2 |
| 2.3% soda ash | 3 | 3 |
| 2.3% soda ash and 0.1% copolymer | 11 | 6 |
| 2.3% soda ash and 0.2% copolymer | 21 | 5.5 |

These results show that the graft copolymers of acrylic acid and methyl cellulose, and water-soluble salts thereof, when used in combination with a sub-bentonitic clay, are effective to enhance the usefulness of the clay in drilling muds.

Although this invention has been described in relation to specific embodiments, it will be apparent that obvious modifications may be made by one skilled in the art without departing from the intended scope of the invention as defined in the appended claims.

I claim:

1. As a composition of matter, an admixture of a sub-bentonitic clay and a minor amount of at least one graft copolymer of acrylic acid and from about 0.1 to about 10% by weight, based on the weight of said acrylic acid, of methyl cellulose, or a water-soluble salt of said graft copolymer.

2. A composition of matter in accordance with claim 1 wherein said graft copolymer is an ultraviolet light or peroxygen-type compounds induced graft copolymerization product.

3. A composition of matter in accordance with claim 2 wherein said graft copolymer is a peroxide free radical induced graft copolymerization product.

4. A composition of matter in accodance with claim 3 wherein the amount of said graft copolymer or salt thereof is from about 0.1 to about 12 pounds per ton of said clay, and said clay was treated with from about 0.5 to about 7% by weight, based on the weight of said clay of soda ash.

5. A composition of matter in accordance with claim 4 wherein the amonut of said graft copolymer or salt thereof is from about 0.5 to about 4 pounds per ton of said clay, and said clay was treated with from about 2 to about 4% by weight, based on the weight of said clay, of soda ash.

6. A composition of matter in accordance with claim 3 containing from about 0.5 to about 4 pounds per ton of said clay of a graft copolymer of acrylic acid and from about 0.25 to about 5.0% by weight, based on the weight of said acrylic acid, of methyl cellulose.

7. A composition of matter in accordance wtih claim 3 containing from about 0.5 to about 4 pounds per ton of said clay of an alkali metal or ammonium salt of a graft copolymer of acrylic acid and from about 0.25 to about 5.0% by weight, based on the weight of said acrylic acid, of methyl cellulose.

8. A drilling fluid consisting essentially of water, a sub-bentonitic clay, and at least one graft copolymer of acrylic acid and from about 0.1 to about 10% by weight, based on the weight of said acrylic acid, of methyl cellulose, or a water-soluble salt of said graft copolymer, said graft copolymer or salt thereof being present in an amount sufficient to increase the yield of said clay.

9. A drilling fluid in accordance with claim 8 wherein said graft copolymer is an ultraviolet or peroxygen-type compound induced graft copolymerization product.

10. A drilling fluid in accordance with claim 9 wherein said graft copolymer is a peroxide free radical induced graft copolymerization product.

11. A drilling fluid in accordance with claim 10 wherein the amount of said graft copolymer or salt thereof is from about 0.1 to about 12 pounds per ton of said clay, and said clay was treated with from about 0.5 to about 7.0% by weight, based on the weight of said clay, of soda ash.

12. A drilling fluid in accordance with claim 11 containing from about 0.5 to about 4 pounds per ton of said clay of a graft copolymer of acrylic acid and from about 0.25 to about 5% by weight, based on the weight of said acrylic acid, of methyl cellulose; and said clay was treated with from about 2 to about 4% by weight, based on the weight of said clay, of soda ash.

13. A drilling fluid in accordance with claim 11 containing from about 0.5 to about 4 pounds per ton of said clay of an alkali metal or ammonium salt of a graft copolymer of acrylic acid and from about 0.25 to about 5% by weight, based on the weight of said acrylic acid, of methyl cellulose; and said clay was treated with from about 2 to about 4% by weight, based on the weight of said clay, of soda ash.

14. In a method of drilling a well by operating a power-driven cutting bit in the bottom of the well to drill the well deeper and thus produce bit cuttings, and circulating a drilling fluid in the well to remove the bit cuttings from the well, the improvement which comprises circulating in said well the drilling fluid of claim 9.

15. A method of drilling a well in accordance with claim 14 wherein the amount of said graft copolymer or salt thereof in said drilling fluid is from about 0.1 to about 12 pounds per ton of said clay; and said clay was treated with from about 0.5 to about 7.0% by weight, based on the weight of said clay, of soda ash.

16. A method of drilling a well in accordance with claim 15 wherein said drilling fluid contains from about 0.5 to about 4 pounds per ton of said clay of a graft copolymer of acrylic acid and from about 0.25 to about 5% by weight, based on the weight of said acrylic acid, of methyl cellulose; and said clay was treated with from about 2 to about 4% by weight, based on the weight of said clay, of soda ash.

17. A method of drilling a well in accordance with claim 15 wherein said drilling fluid contains from about 0.5 to about 4 pounds per ton of said clay, of an alkali metal or ammonium salt of a graft copolymer of acrylic acid and from about 0.25 to about 5% by weight, based on the weight of said acrylic acid, of methyl cellulose; and said clay was treated with from about 2 to about 4% by weight, based on the weight of said clay, of soda ash.

References Cited

UNITED STATES PATENTS

| | | | |
|---|---|---|---|
| 3,081,260 | 3/1963 | Park | 252—8.5 |
| 3,220,946 | 11/1965 | Turner | 252—8.5 |
| 3,323,603 | 6/1967 | Lummus et al. | 175—65 |
| 3,471,402 | 10/1969 | Shannon et al. | 252—8.5 |

WILLIAM H. SHORT, Primary Examiner

L. M. PHYNES, Assistant Examiner

U.S. Cl. X.R.

260—17